(12) United States Patent
Hecht

(10) Patent No.: US 8,678,718 B2
(45) Date of Patent: Mar. 25, 2014

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 158 days.

(21) Appl. No.: 13/239,934

(22) Filed: Sep. 22, 2011

(65) Prior Publication Data

US 2012/0099935 A1    Apr. 26, 2012

(30) Foreign Application Priority Data

Oct. 20, 2010    (IL) .......................................... 208826

(51) Int. Cl.
*B23B 27/04* (2006.01)

(52) U.S. Cl.
USPC ............................ 407/117; 407/113; 407/104

(58) Field of Classification Search
USPC .................................. 407/113, 103, 104, 117
See application file for complete search history.

(56) References Cited

U.S. PATENT DOCUMENTS

| | | | | |
|---|---|---|---|---|
| 5,004,379 A | * | 4/1991 | Little ............................. | 407/113 |
| 5,032,050 A | * | 7/1991 | Niebauer et al. ............... | 407/114 |
| 5,203,648 A | * | 4/1993 | Bohannan et al. ............. | 407/113 |
| 6,238,146 B1 | | 5/2001 | Satran et al. | |
| 6,527,486 B2 | * | 3/2003 | Wiman et al. ................. | 408/188 |
| 6,612,207 B2 | | 9/2003 | Schiffers | |
| 6,942,434 B2 | | 9/2005 | Friedman et al. | |
| 7,597,508 B2 | | 10/2009 | Hecht | |
| 7,972,090 B2 | * | 7/2011 | Jonsson et al. ................ | 407/103 |
| 2001/0022123 A1 | * | 9/2001 | Schiffers ......................... | 82/158 |
| 2009/0162154 A1 | | 6/2009 | Jonsson et al. | |

FOREIGN PATENT DOCUMENTS

| | | | |
|---|---|---|---|
| DE | 3446455 A1 | * | 6/1986 |
| EP | 0439317 A2 | | 7/1991 |
| GB | 2070472 A | | 9/1981 |
| GB | 2070472 A | * | 9/1981 |
| JP | 11156606 A | * | 6/1999 |
| JP | 2006167818 A | * | 6/2006 |

OTHER PUBLICATIONS

International Search Report dated Feb. 2, 2012 issued in counterpart PCT Application No. PCT/IL2011/000772.

* cited by examiner

*Primary Examiner* — Daniel Howell
*Assistant Examiner* — Nicole N Ramos
(74) *Attorney, Agent, or Firm* — Womble Carlyle

(57) ABSTRACT

In a cutting tool having an indexable cutting insert with four cutting portions, the cutting insert is securable within a holder portion in four index positions by means of a fastener. The cutting insert has two opposing end surfaces with a peripheral side surface and a central axis extending therebetween, the peripheral side surface having exactly four abutment zones. The insert holder has a holder portion and a body portion, the holder portion having a sidewall surface with a first, second and third reaction zone. The cutting insert is divided into four imaginary quadrants about its central axis and the four abutment zones are located entirely in two of the four imaginary quadrants, and for each index position, three of the four abutment zones are in clamping contact with the three reaction zones.

37 Claims, 4 Drawing Sheets

CUTTING TOOL AND CUTTING INSERT THEREFOR

FIELD OF THE INVENTION

The present invention relates to metal cutting tools for use in turning, grooving, parting and threading operations having an indexable cutting insert with a plurality of cutting portions.

BACKGROUND OF THE INVENTION

Within the field of metal cutting tools used in turning, grooving, parting and threading operations, cutting inserts removably securable in an insert holder have long since provided a way of performing a cutting operation with a suitably hard material, i.e. cemented carbide, in the vicinity of the cutting edge, where the insert holder, manufactured from a less hard material, is reusable following the disposal of a worn or damaged cutting insert.

This type of cutting tool has been further developed to utilize indexable cutting inserts with an increased number of cutting edges, giving economic benefits from providing an increased number of cutting operations per cutting insert. This type of cutting tool has also been developed to provide a more stable and secure means of retaining the indexable insert within the insert holder.

U.S. Pat. No. 6,612,207 discloses an indexable cutting-off bit having four cutting parts and four prismatic chambers. As shown in FIG. 2 of this patent, each prismatic chamber includes two spaced-apart abutment locations, where for each index position of the cutting-off bit in a holding element, three of the eight spaced-apart abutment locations are in contact with three corresponding surfaces at forwardly projecting upper and lower protrusions of the holding element.

U.S. Pat. No. 5,203,648 discloses an indexable cutting insert having a substantially square shape with four cutting edges. The cutting edges are arranged on a first pair of opposed sides of the cutting insert, where each of the opposed sides has a pair of cutting edges separated by an intermediate contact surface. Additional contact surfaces perpendicular to the intermediate contact surfaces are located on a second pair of opposed sides of the cutting insert. For each index position of the cutting insert within an insert holder, one of the intermediate contact surfaces and one of the additional contact surfaces are in clamping contact with the insert holder.

U.S. Pat. No. 6,942,434 discloses an indexable cutting insert having two opposing side surfaces and a peripheral edge surface extending therebetween. The peripheral side surface has five abutment sections and five equally spaced apart cutting portions. For each index position of the cutting insert within an insert pocket of an insert holder, two of the five abutment sections abut upper and lower support walls of the insert pocket. The upper and lower support walls form an acute angle diverging in a direction towards the operative cutting portion of the cutting insert.

U.S. Pat. No. 7,597,508 discloses an indexable cutting insert having two opposing end surfaces and a peripheral side surface located between the end surfaces. The peripheral side surface is divided into five identical segments, each segment having a cutting section, a leading wall and a trailing wall. For each index position of the cutting insert within a forward securing portion of an insert holder, trailing, leading and trailing walls of three consecutive segments respectively abut and bear against first, second and third supports of a securing surface of the forward securing portion. The first and second supports diverge downwardly, and the second and third supports diverge rearwardly.

SUMMARY OF THE INVENTION

In accordance with the present invention, there is provided an indexable cutting insert comprising two opposing end surfaces with a peripheral side surface and a central axis extending therebetween, the cutting insert having four cutting portions and exactly four distinct, spaced apart abutment zones arranged along the peripheral side surface, each of the four abutment zones configured to make clamping contact in at least one index position of the cutting insert, wherein the cutting insert is divided into four imaginary quadrants about the central axis, wherein the four abutment zones are entirely located within two of the four imaginary quadrants, and wherein each of the four cutting portions does not overlap the nearest one of the four abutment zones in a direction along the central axis.

Also in accordance with the present invention, there is provided a cutting tool comprising an insert holder, an indexable cutting insert and a fastener, the cutting insert having two opposing end surfaces with a peripheral side surface and a central axis extending therebetween, the cutting insert having four cutting portions and exactly four distinct, spaced apart abutment zones arranged along the peripheral side surface, the insert holder having a holder portion and a body portion, the holder portion having a sidewall surface with a first, second and third reaction zone, the cutting insert being securable within the holder portion in any one of four index positions by means of the fastener, wherein the cutting insert is divided into four imaginary quadrants about the central axis and the four abutment zones are located entirely in two of the four imaginary quadrants, and wherein for each index position, three of the four abutment zones are in clamping contact with the three reaction zones.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
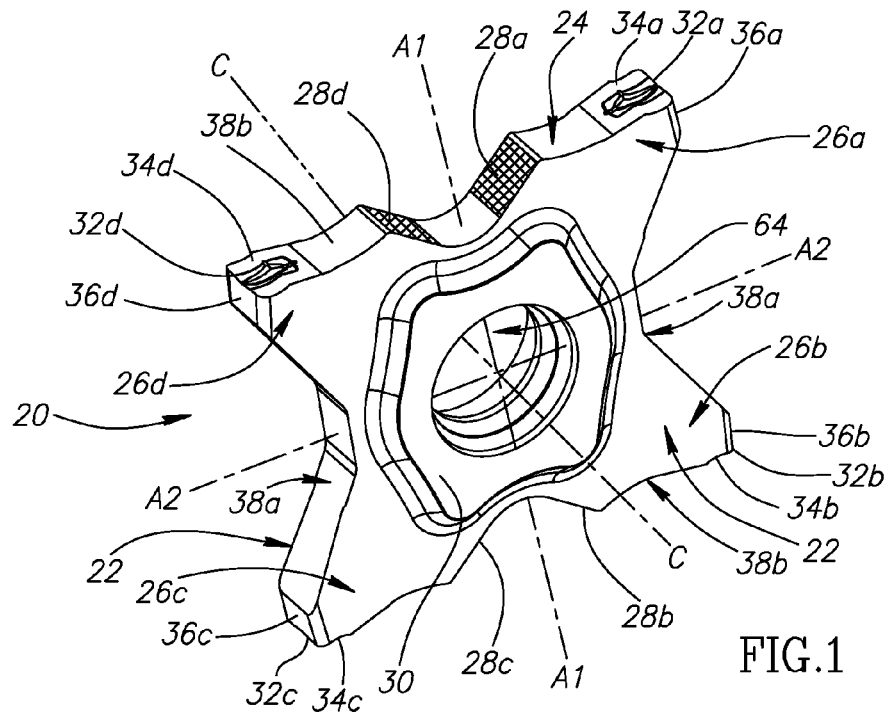
FIG. 1 is a perspective view of a cutting insert in accordance with some embodiments of the present invention.
Figure 2:
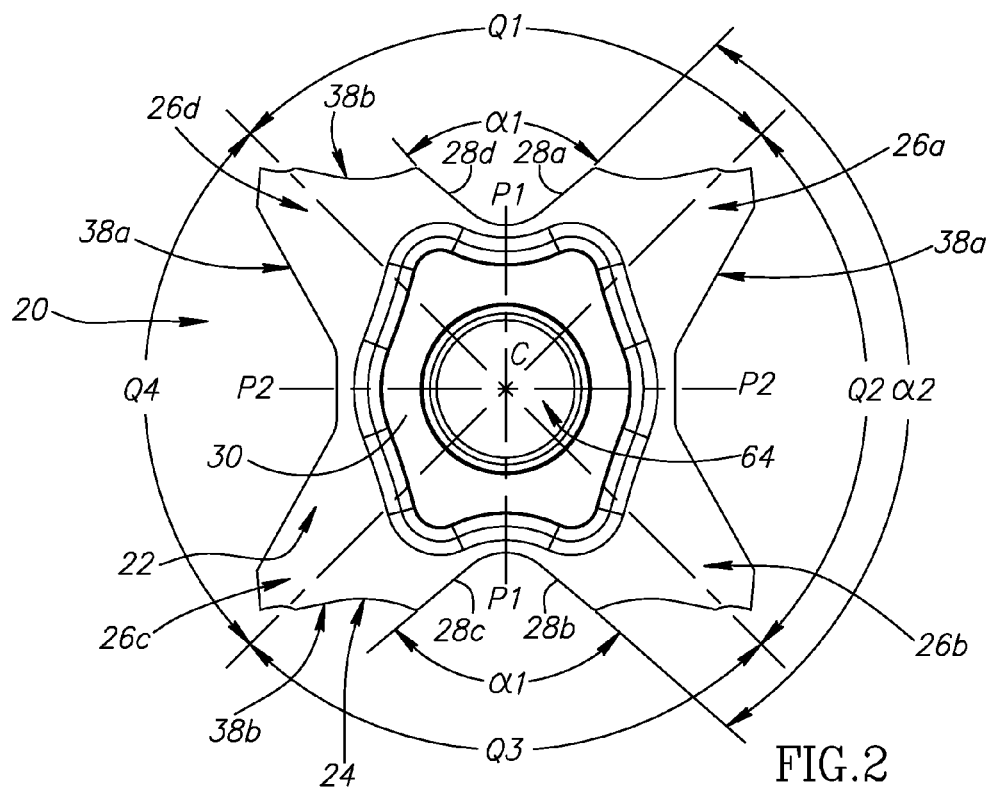
FIG. 2 is a side view of the cutting insert shown in FIG. 1.

Attention is first drawn to FIGS. 1 and 2, showing an indexable cutting insert 20 which may be manufactured by form pressing and sintering a cemented carbide, such as tungsten carbide, and may be coated or uncoated.

The indexable cutting insert 20 has two opposing end surfaces 22 with a peripheral side surface 24 and a central axis C extending therebetween, and four cutting portions 26a, 26b, 26c, 26d. The peripheral side surface 24 has exactly four spaced apart abutment zones 28a, 28b, 28c, 28d, thus giving the indexable cutting insert 20 an abutment ratio Ra equal to 1.0, measured by dividing the number of abutment zones by the number of cutting portions, which is beneficial with respect to manufacturing efficiency. Each of the four abutment zones 28a, 28b, 28c, 28d represents a distinct region of the peripheral side surface 24 which makes clamping contact with a corresponding region of a mating component in at least one index position of the indexable cutting insert 20.

In some embodiments of the present invention, the two opposing end surfaces 22 may be identical.

Also in some embodiments of the present invention, each of the two opposing end surfaces 22 may include a raised support surface 30 perpendicular to the central axis C. The two raised support surfaces 30 represent outermost portions of the indexable cutting insert 20 in a direction parallel to the central axis C, and enable the same indexable cutting insert 20 to be used in both left and right hand cutting tools.

As shown in FIG. 2, the indexable cutting insert 20 is divided into four imaginary quadrants Q1, Q2, Q3, Q4 about the central axis C, with the four abutment zones 28a, 28b, 28c, 28d being entirely located within two Q1, Q3 of the four imaginary quadrants Q1, Q2, Q3, Q4.

In some embodiments of the present invention, the four abutment zones 28a, 28b, 28c, 28d may be planar. For these embodiments, each of the four abutment zones 28a, 28b, 28c, 28d may be parallel to the central axis C.

Alternative embodiments of the present invention (not shown) may include a cutting insert having a peripheral side surface with four non-planar abutment zones. For these embodiments, each abutment zone may have an outwardly convex shape.

For embodiments where the four abutment zones 28a, 28b, 28c, 28d are planar, each of the four abutment zones 28a, 28b, 28c, 28d may form an external abutment angle α1 of less than 180° with another one of the four abutment zones 28d, 28c, 28b, 28a. For these embodiments, the four abutment zones 28a, 28b, 28c, 28d are typically configured in pairs in opposite first and third imaginary quadrants Q1, Q3, where as shown in FIG. 2, a pair of first and fourth abutment zones 28a, 28d forming the external abutment angle α1 is entirely located in the first quadrant Q1 and a pair of second and third abutment zones 28b, 28c forming the same external abutment angle α1 is entirely located in the third quadrant Q3. Typically in these embodiments, an external abutment angle α1 having a value between 60° and 140° is preferred.

There are benefits associated with this way of configuring the four abutment zones 28a, 28b, 28c, 28d with respect to manufacturing efficiency, in that only three angles associated with the relative positioning of the four abutment zones 28a, 28b, 28c, 28d are required to be controlled during the manufacturing process; the external abutment angle α1 between the first and fourth abutment zones 28a, 28d, the external abutment angle α1 between the second and third abutment zones 28b, 28c, and an internal abutment angle α2 between the first and second abutment zones 28a, 28b.

It should be appreciated that use of the terms "internal angle" and "external angle" throughout the description and claims refers to an angle between two planar surface components or zones as measured internal and external to the member on which the surface components or zones are formed, respectively.

In some embodiments of the present invention, the four cutting portions 26a, 26b, 26c, 26d may be identical, each cutting portion 26a, 26b, 26c, 26d having a cutting edge 32a, 32b, 32c, 32d formed by the intersection of a rake surface 34a, 34b, 34c, 34d and a relief surface 36a, 36b, 36c, 36d, the four rake surfaces 34a, 34b, 34c, 34d and the four relief surfaces 36a, 36b, 36c, 36d located on the peripheral side surface 24.

In general, each of the four cutting portions 26a, 26b, 26c, 26d and its corresponding cutting edge 32a, 32b, 32c, 32d does not overlap the nearest one of the four abutment zones 28a, 28b, 28c, 28d in a direction along the central axis C.

In some embodiments of the present invention, the four cutting edges 32a, 32b, 32c, 32d may extend in a direction generally parallel to the central axis C.

In some embodiments of the present invention, as shown in FIG. 2, the indexable cutting insert 20 may have mirror symmetry about a first plane P1 containing the central axis C. For these embodiments, the first plane P1 may bisect the first and third imaginary quadrants Q1, Q3 within which the four abutment zones 28a, 28b, 28c, 28d are entirely located, and each of the four rake surfaces 34a, 34b, 34c, 34d may be generally closer to the first plane P1 than its associated relief surface 36a, 36b, 36c, 36d.

In some embodiments of the present invention, as shown in FIG. 2, the indexable cutting insert 20 may have mirror symmetry about a second plane P2 containing the central axis C and perpendicular to the first plane P1.

For embodiments where the indexable cutting insert 20 has mirror symmetry about the first and second planes P1, P2, the cutting insert 20 may be indexed by performing 180° rotation about the central axis C, 180° rotation about a first axis A1 lying in the first plane P1 and perpendicular to the central axis C, or 180° rotation about a second axis A2 lying in the second plane P2 and perpendicular to the central axis C.

Also, for embodiments where the indexable cutting insert 20 has mirror symmetry about the first and second planes P1, P2, the peripheral side surface 24 may include two pairs of identical opposing side surfaces 38a, 38b, a first pair of opposing side surfaces 38a mirror symmetrical about the first plane P1 including the four relief surfaces 36a, 36b, 36c, 36d, and a second pair of opposing side surfaces 38b mirror symmetrical about the second plane P2 including the four rake surfaces 34a, 34b, 34c, 34d and the four abutment zones 28a, 28b, 28c, 28d. The four cutting edges 32a, 32b, 32c, 32d may be formed at the intersections between the first and second pairs of opposing side surfaces 38a, 38b.

There are benefits associated with this way of configuring the four rake surfaces 34a, 34b, 34c, 34d with respect to manufacturing efficiency, in that four rake surface forming pins (not shown) slidably positioned in a cutting insert mold cavity (not shown) prior to form pressing the cemented carbide and slidably retracted from the cutting insert mold cavity following form pressing the cemented carbide, may only require the operation of two linear actuators (not shown) having a stroke direction perpendicular to the second plane P2, where two rake surface forming pins are associated with each linear actuator.

For embodiments where the indexable cutting insert 20 has mirror symmetry about the first and second planes P1, P2 and each of the four abutment zones 28a, 28b, 28c, 28d is parallel to the central axis C, the first abutment zone 28a is parallel to the third abutment zone 28c, and the second abutment zone 28b is parallel to the fourth abutment zone 28d.

Figure 3:
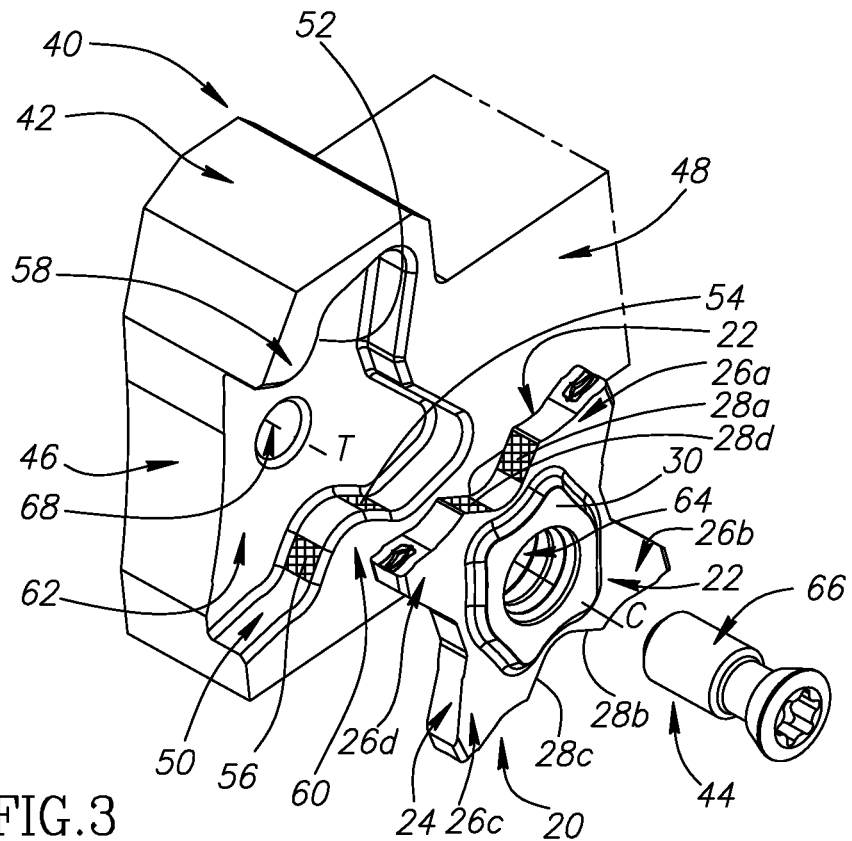
FIG. 3 is an exploded perspective view of a cutting tool in accordance with some embodiments of the present invention.
Figure 4:
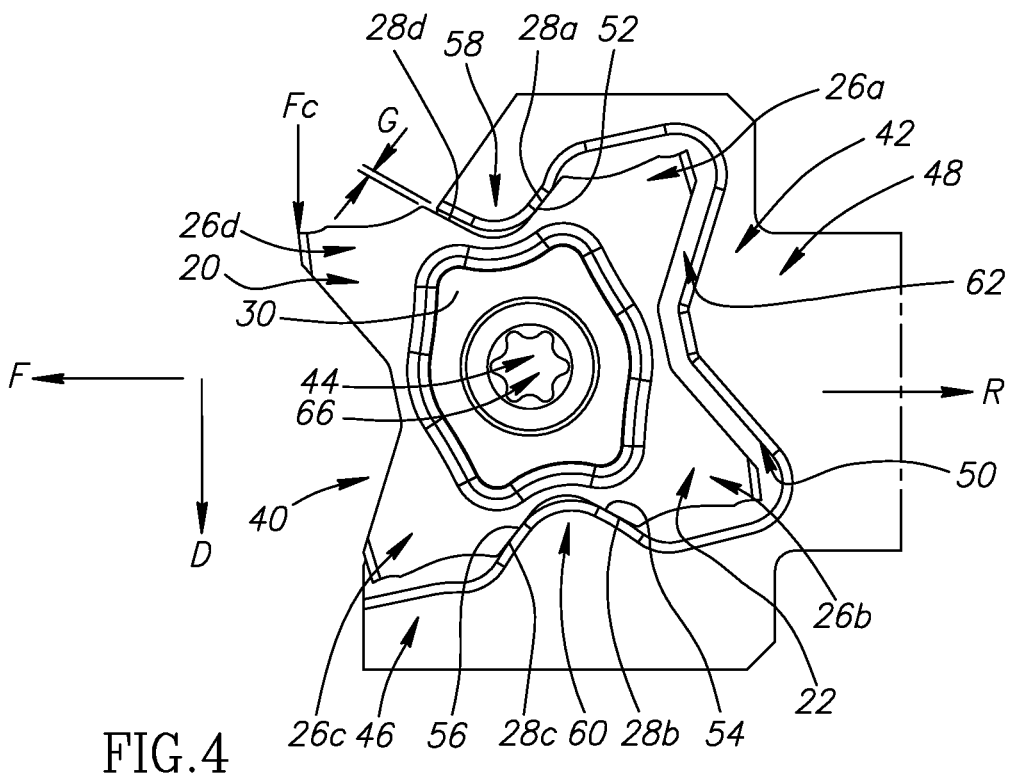
FIG. 4 is a side view of the cutting tool shown in FIG. 3.
Figure 5:
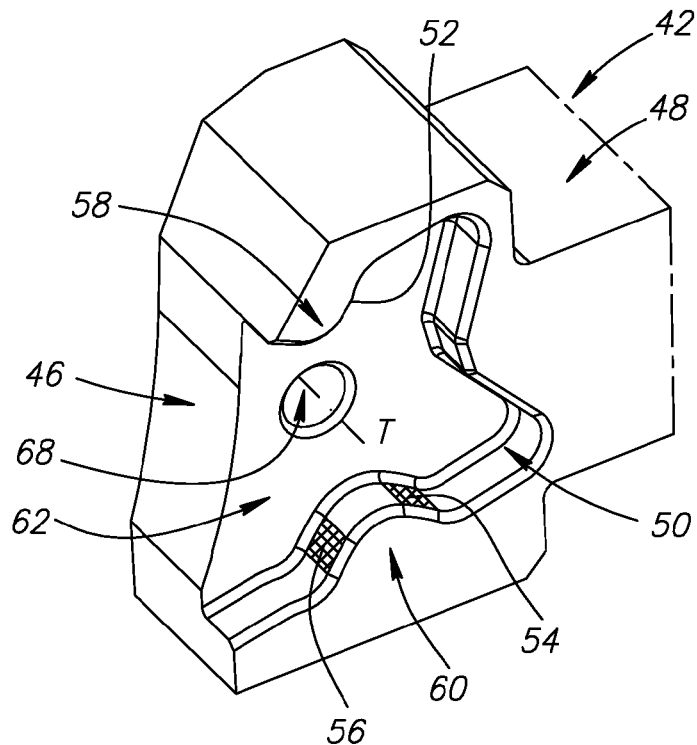
FIG. 5 is a first perspective view of an insert holder in accordance with some embodiments of the present invention.
Figure 6:
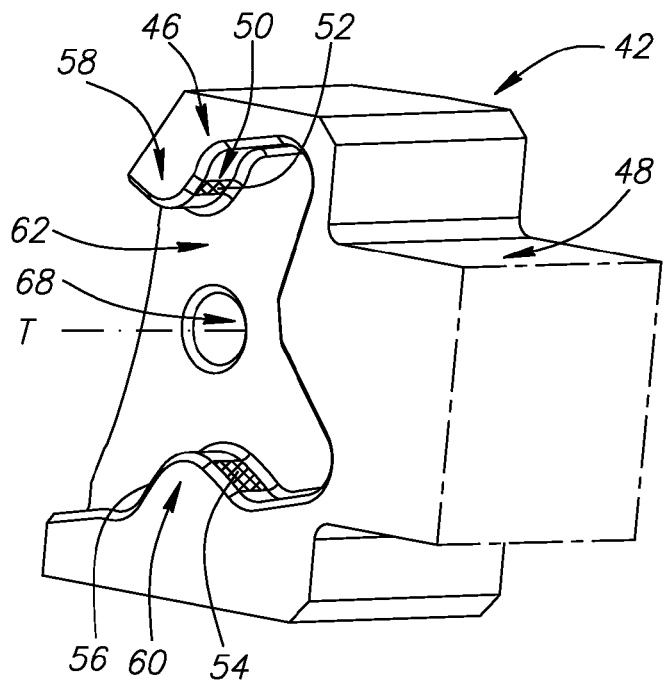
FIG. 6 is a second perspective view of the insert holder in accordance with some embodiments of the present invention.

Attention is now drawn to FIGS. 3 and 4, showing a right hand cutting tool 40 comprising the indexable cutting insert 20, a right handed insert holder 42 and a fastener 44.

The right handed insert holder 42, which may equally be left handed to provide a left hand cutting tool (not shown), has a holder portion 46 and a body portion 48, with the cutting insert 20 being secured within the holder portion 46 by means of the fastener 44.

In some embodiments of the present invention, the insert holder 42 may be manufactured from hardened steel and the holder portion 46 may also be rigid and non-resilient.

As shown in FIGS. 3 to 6, the holder portion 46 has an insert pocket comprising a base surface 62 and a sidewall surface 50. This sidewall surface 50 is provided with a first, second and third reaction zone 52, 54, 56 and the cutting insert 20 is securable within the holder portion 46 in four different index positions, where for each index position three of the four abutment zones 28a, 28b, 28c, 28d are in clamping contact with the three reaction zones 52, 54, 56. Also for each index position, a gap G is typically formed between one of the four abutment zones 28a, 28b, 28c, 28d and the sidewall surface 50, and no other regions or zones on surfaces of the indexable cutting insert 20 extending in generally the same direction as the central axis C are in clamping contact with the holder portion 46.

In some embodiments of the present invention, the first, second and third reaction zones 52, 54, 56 may be non-planar, typically having an outwardly convex shape, whereas alternative embodiments of the present invention (not shown) may include an insert holder having a sidewall surface with three planar reaction zones.

FIG. 4 shows the cutting insert 20 secured within the holder portion 46 in a first index position where the first abutment zone 28a is in clamping contact with the first reaction zone 52, the second abutment zone 28b is in clamping contact with the second reaction zone 54, the third abutment zone 28c is in contact with the third reaction zone 56, and the gap G is formed between the fourth abutment zone 28d and the sidewall surface 50.

In some embodiments of the present invention, the body portion 48 may longitudinally extend away from the holder portion 46 in a rearward direction R and the first and second reaction zones 52, 54 may also diverge in the rearward direction R. For these embodiments, as shown in FIG. 4, an operative cutting portion 26d of the indexable cutting insert 20 protrudes away from the holder portion 46 in a forward direction F opposite to the rearward direction R, and a cutting force Fc acts on the operative cutting portion 26d during the cutting operation of a workpiece (not shown) in a direction transverse to the rearward and forward directions R, F. For embodiments where the cutting force Fc is directed in a generally downward direction D transverse to the rearward and forward directions R, F, as shown in FIG. 4, the first reaction zone 52 is located on the sidewall surface 50 at an upper bulge 58 of the holder portion 46 and the second and third reaction zones 54, 56 are located on the sidewall surface 50 at a lower bulge 60 of the holder portion 46, where the lower bulge 60 is positioned in a downward direction D relative to the upper bulge 58.

There are benefits associated with this way of configuring the cutting tool 40 with respect to retaining the indexable cutting insert 20 within the insert holder 42 in a secure and stable manner, in that for each index position of the indexable cutting insert 20, the cutting force Fc reinforces the clamping contact between three of the four abutment zones 28a, 28b, 28c, 28d and the three reaction zones 52, 54, 56, and also the rearwardly diverging first and second reaction zones 52, 54 physically prevent the indexable cutting insert 20 from being 'pulled' from the insert holder 42 in the forward direction F.

In some embodiments of the present invention, as shown in FIG. 4, one of the two raised support surfaces 30 is in clamping contact with the base surface 62 of the insert pocket of holder portion 46, where the base surface 62 extends in a transverse direction to the sidewall surface 50.

Figure 7:
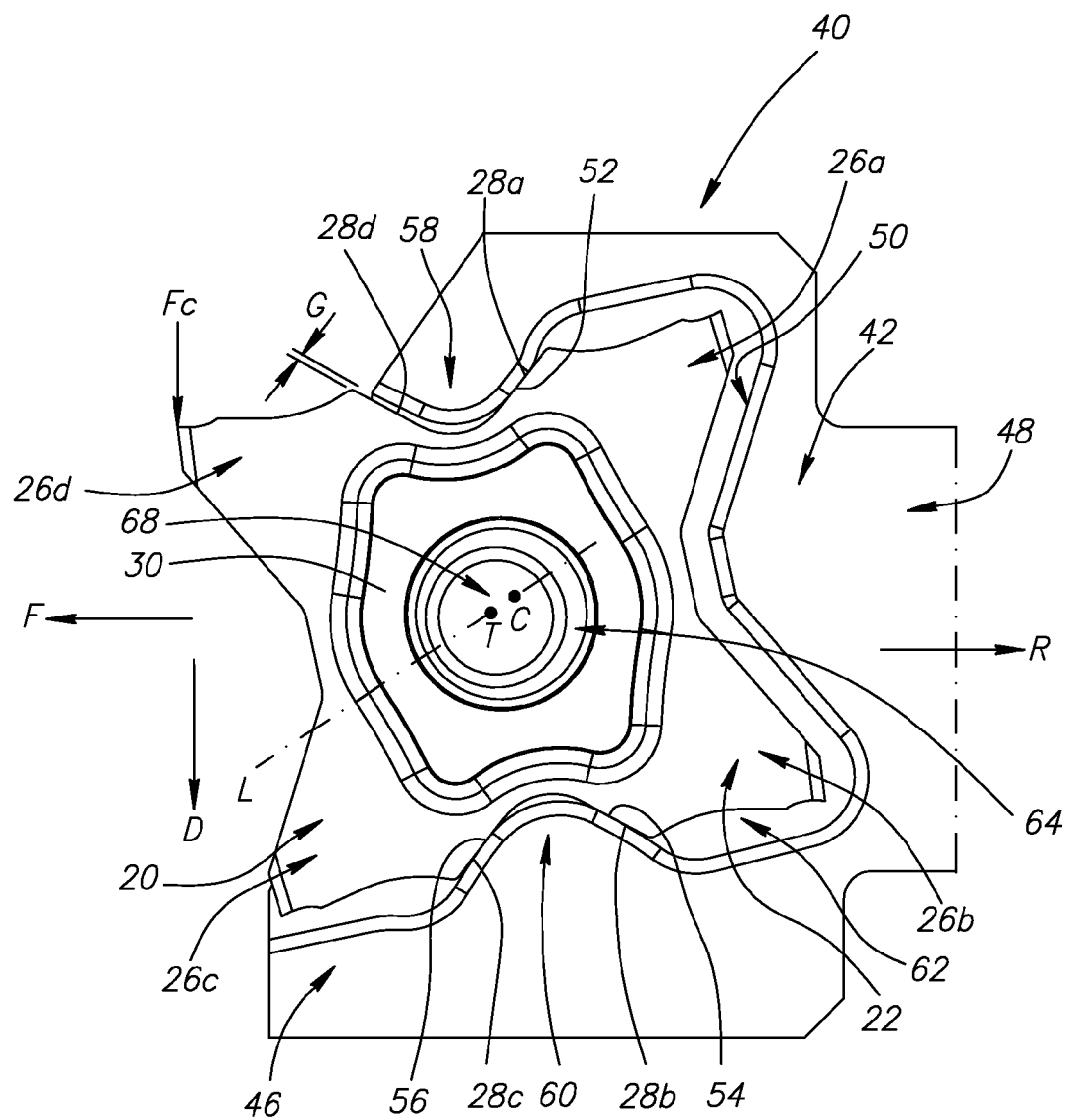
FIG. 7 is a side view of the cutting tool shown in FIG. 3, without a fastener.

Also, in some embodiments of the present invention, the indexable cutting insert 20 may include a central bore 64 coaxial with the central axis C extending between and opening out to the two opposing end surfaces 22. For these embodiments, as shown in FIGS. 3 and 4, the fastener 44 may be in the form of a clamping screw 66 extending through the central bore 64 and engaging a threaded bore 68 in the base surface 62 of the holder portion 46. For these embodiments, as shown in FIG. 7, the threaded bore 68 may be eccentric in relation to the central bore 64 with a thread axis T of the threaded bore 68 being positioned on an imaginary line L in the forward and downward direction F, D relative to the central axis C. Tightening of the clamping screw 66 within the threaded bore 68 urges the indexable cutting insert 20 in the forward and downward direction F, D, thus ensuring clamping contact between three of the four abutment zones 28a, 28b, 28c, 28d and the three reaction zones 52, 54, 56.

Although the present invention has been described to a certain degree of particularity, it should be understood that various alterations and modifications could be made without departing from the spirit or scope of the invention as hereinafter claimed.

What is claimed is:

1. An indexable cutting insert (20) comprising two opposing end surfaces (22) with a peripheral side surface (24) and a central axis (C) extending therebetween, the cutting insert (20) having four cutting portions (26a, 26b, 26c, 26d) and exactly four distinct, spaced apart abutment zones (28a, 28b, 28c, 28d) arranged along the peripheral side surface (24), each of the four abutment zones (28a, 28b, 28c, 28d) configured to make clamping contact in at least one index position of the cutting insert (20), wherein the cutting insert (20) is divided into four imaginary quadrants (Q1, Q2, Q3, Q4) about the central axis (C), and wherein the four abutment zones (28a, 28b, 28c, 28d) are entirely located within two (Q1, Q3) of the four imaginary quadrants (Q1, Q2, Q3, Q4).

2. The indexable cutting insert (20) according to claim 1, wherein the two opposing end surfaces (22) are identical.

3. The indexable cutting insert (20) according to claim 1, wherein a central bore (64) extends between and opens out to the two opposing end surfaces (22), and wherein the central bore (64) is coaxial with the central axis (C).

4. The indexable cutting insert (20) according to claim 1, wherein each of the four abutment zones (28a, 28b, 28c, 28d) is planar.

5. The indexable cutting insert (20) according to claim 4, wherein each of the four planar abutment zones (28a, 28b, 28c, 28d) forms an external abutment angle ($\alpha 1$) of less than 180° with another one of the four planar abutment zones (28d, 28c, 28b, 28a).

6. The indexable cutting insert (20) according to claim 4, wherein each of the four planar abutment zones (28a, 28b, 28c, 28d) is parallel to the central axis (C).

7. The indexable cutting insert (20) according to claim 1, wherein the four cutting portions (26a, 26b, 26c, 26d) are identical, each cutting portion (26a, 26b, 26c, 26d) having a cutting edge (32a, 32b, 32c, 32d) formed by the intersection of a rake surface (34a, 34b, 34c, 34d) and a relief surface (36a, 36b, 36c, 36d), the four rake surfaces (34a, 34b, 34c, 34d) and the four relief surfaces (36a, 36b, 36c, 36d) located on the peripheral side surface (24).

8. The indexable cutting insert (20) according to claim 7, wherein the peripheral side surface (24) includes two pairs of identical opposing side surfaces (38a, 38b), and wherein a second pair of opposing side surfaces (38b) includes the four rake surfaces (34a, 34b, 34c, 34d).

9. The indexable cutting insert (20) according to claim 7, having mirror symmetry about a first plane (P1) containing the central axis (C).

10. The indexable cutting insert (20) according to claim 9, wherein the four abutment zones (28a, 28b, 28c, 28d) are entirely located in first and third imaginary quadrants (Q1, Q3), and wherein the first plane P1 bisects the first and third imaginary quadrants (Q1, Q3).

11. The indexable cutting insert (20) according to claim 10, wherein each rake surface (34a, 34b, 34c, 34d) is generally closer to the first plane (P1) than its associated relief surface (36a, 36b, 36c, 36d).

12. The indexable cutting insert (20) according to claim 9, having mirror symmetry about a second plane (P2) containing the central axis (C) and perpendicular to the first plane (P1).

13. The indexable cutting insert (20) according to claim 1, wherein each of the two opposing end surfaces (22) includes a raised support surface (30) perpendicular to the central axis (C).

14. A cutting tool (40) comprising an insert holder (42), an indexable cutting insert (20) and a fastener (44),
the cutting insert (20) having two opposing end surfaces (22) with a peripheral side surface (24) and a central axis (C) extending therebetween,
the cutting insert having four cutting portions (26a, 26b, 26c, 26d) and exactly four distinct, spaced apart abutment zones (28a, 28b, 28c, 28d) arranged along the peripheral side surface (24),
the insert holder (42) having a holder portion (46) and a body portion (48), the holder portion (46) having a sidewall surface (50) with a first, second and third reaction zone (52, 54, 56),
the cutting insert (20) being securable within the holder portion (46) in any one of four index positions by means of the fastener (44),
wherein the cutting insert (20) is divided into four imaginary quadrants (Q1, Q2, Q3, Q4) about the central axis (C) and the four abutment zones (28a, 28b, 28c, 28d) are located entirely in two (Q1, Q3) of the four imaginary quadrants (Q1, Q2, Q3, Q4), and
wherein for each index position, three of the four abutment zones (28a, 28b, 28c, 28d) are in clamping contact with the three reaction zones (52, 54, 56).

15. The cutting tool (40) according to claim 14, wherein each of the cutting insert's four cutting portions (26a, 26b, 26c, 26d) does not overlap the nearest one of the four abutment zones (28a, 28b, 28c, 28c) in a direction along the central axis (C).

16. The cutting tool (40) according to claim 14, wherein each of the cutting insert's four abutment zones (28a, 28b, 28c, 28d) is planar.

17. The cutting tool (40) according to claim 16, wherein each of the cutting insert's four planar abutment zones (28a, 28b, 28c, 28d) forms an external abutment angle (α1) of less than 180° with another one of the four planar abutment zones (28b, 28a, 28d, 28c).

18. The cutting tool (40) according to claim 16, wherein each of the cutting insert's four planar abutment zones (28a, 28b, 28c, 28d) is parallel to the central axis (C).

19. The cutting tool (40) according to claim 14, wherein the cutting insert's four cutting portions (26a, 26b, 26c, 26d) are identical, each cutting portion (26a, 26b, 26c, 26d) having a cutting edge (32a, 32b, 32c, 32d) formed by the intersection of a rake surface (34a, 34b, 34c, 34d) and a relief surface (36a, 36b, 36c, 36d), the four rake surfaces (34a, 34b, 34c, 34d) and the four relief surfaces (36a, 36b, 36c, 36d) located on the peripheral side surface (24).

20. The cutting tool (40) according to claim 19, wherein the cutting insert's peripheral side surface (24) includes two pairs of identical opposing side surfaces (38a, 38b), and wherein a second pair of opposing side surfaces (38b) includes the four rake surfaces (34a, 34b, 34c, 34d).

21. The cutting tool (40) according to claim 19, wherein the cutting insert (20) has mirror symmetry about a first plane (P1) containing the central axis (C).

22. The cutting tool (40) according to claim 21, wherein the cutting insert's four abutment zones (28a, 28b, 28c, 28d) are entirely located in first and third imaginary quadrants (Q1, Q3), and wherein the first plane P1 bisects the first and third imaginary quadrants (Q1, Q3).

23. The cutting tool (40) according to claim 22, wherein each rake surface (34a, 34b, 34c, 34d) of the cutting insert (20) is generally closer to the first plane (P1) than its associated relief surface (36a, 36b, 36c, 36d).

24. The cutting tool (40) according to claim 21, wherein the cutting insert (20) has minor symmetry about a second plane (P2) containing the central axis (C) and perpendicular to the first plane (P1).

25. The cutting tool (40) according to claim 14, wherein the insert holder's body portion (48) longitudinally extends away from the holder portion (46) in a rearward direction (R), and wherein the first and second reaction zones (52, 54) diverge in the rearward direction (R).

26. The cutting tool (40) according to claim 14, wherein the cutting insert's two opposing end surfaces (22) are identical.

27. The cutting tool (40) according to claim 14, wherein each of the cutting insert's two opposing end surfaces (22) includes a raised support surface (30) perpendicular to the central axis (C).

28. The cutting tool (40) according to claim 27, wherein one of the two raised support surfaces (30) is in clamping contact with a base surface (62) of the holder portion (46), the base surface (62) extending in a transverse direction to the sidewall surface (50).

29. The cutting tool (40) according to claim 28, wherein the cutting insert (20) comprises a central bore (64) which extends between and opens out to the two opposing end surfaces (22), and wherein the central bore (64) is coaxial with the central axis (C).

30. The cutting tool (40) according to claim 29, wherein the fastener (44) is in the form of a clamping screw (66) extending through the central bore (64) of the cutting insert (20) and engaging a threaded bore (68) in the base surface (62) of the holder portion (46).

31. The cutting tool (40) according to claim 30, wherein the threaded bore (68) is eccentric in relation to the central bore (64).

32. The cutting tool (40) according to claim 14, wherein the holder portion (46) is rigid and non-resilient.

33. An indexable cutting insert (20) comprising two opposing end surfaces (22) with a peripheral side surface (24) and a central axis (C) extending therebetween, the cutting insert (20) having four cutting portions (26a, 26b, 26c, 26d), four distinct spaced apart abutment zones (28a, 28b, 28c, 28d), and mirror symmetry about mutually perpendicular first and second planes (P1, P2) containing the central axis (C), each of the four cutting portions (26a, 26b, 26c, 26d) having a cutting edge (32a, 32b, 32c, 32d) formed by the intersection of a rake surface (34a, 34b, 34c, 34d) and a relief surface (36a, 36b, 36c, 36d), the four rake surfaces (34a, 34b, 34c, 34d) and the four relief surfaces (36a, 36b, 36c, 36d) located on the peripheral side surface (24); and each of the four abutment zones (28a, 28b, 28c, 28d) arranged along the peripheral side surface (24) and configured to make clamping contact in at least one index position of the cutting insert (20), wherein:

the peripheral side surface (24) includes two pairs of opposing side surfaces (38a, 38b), a first pair of opposing side surfaces (38a) mirror symmetrical about the first plane (P1), and a second pair of opposing side surfaces (38b) minor symmetrical about the second plane (P2), the four cutting edges (32a, 32b, 32c, 32d) are formed at the intersections between the two pairs of opposing side surfaces (38a, 38b), and the second pair of opposing side surfaces (38b) includes the four rake surfaces (34a, 34b, 34c, 34d) and the four abutment zones (28a, 28b, 28c, 28d).

34. The indexable cutting insert (20) according to claim 33, wherein each of the four abutment zones (28a, 28b, 28c, 28d) is planar.

35. The indexable cutting insert (20) according to claim 34, wherein each of the four planar abutment zones (28a, 28b, 28c, 28d) forms an external abutment angle ($\alpha 1$) of less than 180° with another one of the four planar abutment zones (28d, 28c, 28b, 28a).

36. The indexable cutting insert (20) according to claim 34, wherein each of the four planar abutment zones (28a, 28b, 28c, 28d) is parallel to the central axis (C).

37. The indexable cutting insert (20) according to claim 35, wherein the external abutment angle ($\alpha 1$) has a value between 60° and 140°.

* * * * *